(12) United States Patent
Sanders et al.

(10) Patent No.: US 7,666,241 B2
(45) Date of Patent: Feb. 23, 2010

(54) FERTILIZER-POLYMER MIXTURES WHICH INHIBIT NITRIFICATION IN SOILS

(75) Inventors: John Larry Sanders, Leawood, KS (US); Grigory Mazo, Wilmette, IL (US); Jacob Mazo, Wilmette, IL (US)

(73) Assignee: Specialty Fertilizer Products, LLC, Leawood, KS (US), part interest ( * ) Notice: Subject to any disclaimer, the term of this patent is extended or adjusted under 35 U.S.C. 154(b) by 450 days.

(21) Appl. No.: 11/626,702

(22) Filed: Jan. 24, 2007

(65) Prior Publication Data
US 2008/0173053 A1    Jul. 24, 2008

(51) Int. Cl.
C05C 9/00 (2006.01)
C08G 63/91 (2006.01)

(52) U.S. Cl. .......................................... 71/30; 525/418

(58) Field of Classification Search .................... 71/27, 71/28, 30; 525/418
See application file for complete search history.

(56) References Cited

U.S. PATENT DOCUMENTS

| | | | |
|---|---|---|---|
| 5,024,689 | A | 6/1991 | Sutton et al. |
| 5,364,438 | A | 11/1994 | Weston et al. |
| 5,698,003 | A | 12/1997 | Omilinsky et al. |
| 6,139,596 | A * | 10/2000 | Barth et al. ................... 71/28 |
| 6,515,090 | B1 | 2/2003 | Sanders et al. |

OTHER PUBLICATIONS

University of Wisconsin System Board of Regents and University of Wisconsin-Extension; L.G. Buncy; Soil and Applied Nitrogen; 1998.
Technion—Israel Institute of Technology, Faculty of Civil and Environmental Engineering; A. Shaviv; Controlled Release Fertilizers; IFA International Workshop on Enhanced-Efficiency Fertilizers; Frankfurt, Germany, Jun. 2005.
Queen's University of Belfast, UK; C. Watson; Urease Inhibitors; IFA International Workshop on Enhanced-Efficiency Fertilizers; Frankfurt, Germany, Jun. 2005.
Agronomy Journal, vol. 91; Hernan Sainz Rozas, Hernan E. Echeverria, Guillermo A. Studdert and Fernando H. Andrade; No-Till Maize Nitrogen Uptake and Yield: Effect of Urease inhibitor and Application Time; Nov.-Dec. 1999.
University of Wisconsin-Madison, Department of Soil Science; Larry G. Bundy; Managing Urea-Containing Fertilizers; Area Fertilizer Dealer Meeting Nov.-Dec. 2001.
University of Wisconsin, Department of Soil Science; Larry G. Bundy; Nitrogen Management in 2005, Rates and Economics; 2005.
University of Georgia, Tifton, Crop and Soil Sciences; Glen Harris; Evaluation of Agrotain Urease Inhibito for Cotton Production in the Southeast; 2003.
Taylor and Francis Group; S. Malhi, E. Oliver, G. Mayerle, G. Kruger, K.S. Gill; Improving Effectiveness of Seedrow-placed Urea with Urease Inhibitor and Polymer Coating for Durum Wheat and Canola; vol. 34, No. 11-12, 2003, p. 1709-1727.
SpringerLink, Biology and Fertility of Soils; L. Vittori Antisari, C. Marzadori, P. Gioacchini, S. Ricci and C. Gessa; Effects of the Urease Inhibitor N-(n-butyl) Phosphorothioic Triamide in Low Concentrations on Ammonia Volatilization and Evolution of Mineral Nitrogen; Dec. 2004, p. 196-201.
Proc. National Academy of Sciences; Michael J. Krogmeier, Gregory W. McCarty and John M. Bremner; Potential Phytotoxicity Associated with the use of Soil Urease Inhibitors; vol. 86, Feb. 1989, p. 1110-1112.
BASF Agricultural Center, Limburgerhof, Germany; R. Hahndel and A.H. Wissemeir; Yield and Quality of Field Grown Vegetables Fertilized with Ammonium Based Fertilizers Containing the Nitrification Inhibitor DMPP (ENTEC ®); 2003.
Kentucky Department of Agriculture's Office of Consumer and Environmental Protection; W. Frye; Nitrification Inhibition for Nitrogen Efficiency and Environment Protection; IFA International Workshop on Enhance-Efficienty Fertilizers, Frankfurt, Germany, Jun. 2005.
Ohio State University; Evaluation of Agrotain Urease Inhibitor with UAN Nitrogen Sidedress Applications in Field Corn (2002, 2003, 2004) and Nitrogen Rate and Super N Topdress in Wheat (2003, 2004); Farm Focus Pres Releases.

* cited by examiner

*Primary Examiner*—Stuart Hendrickson
*Assistant Examiner*—Richard M Rump
(74) *Attorney, Agent, or Firm*—Hovey Williams LLP

(57) ABSTRACT

Improved, low-pH aqueous polymer mixtures are provided which can be applied directly to soils or incorporated within ammoniacal nitrogen-containing fertilizers to inhibit nitrification in soils, thus enhancing plant uptake of ammonium and yields. The polymers are advantageously used as metal (e.g., Ca) salts or complexes at pH levels of up to about 2. The polymers have anionic functional groups and are highly water dispersible.

14 Claims, 1 Drawing Sheet

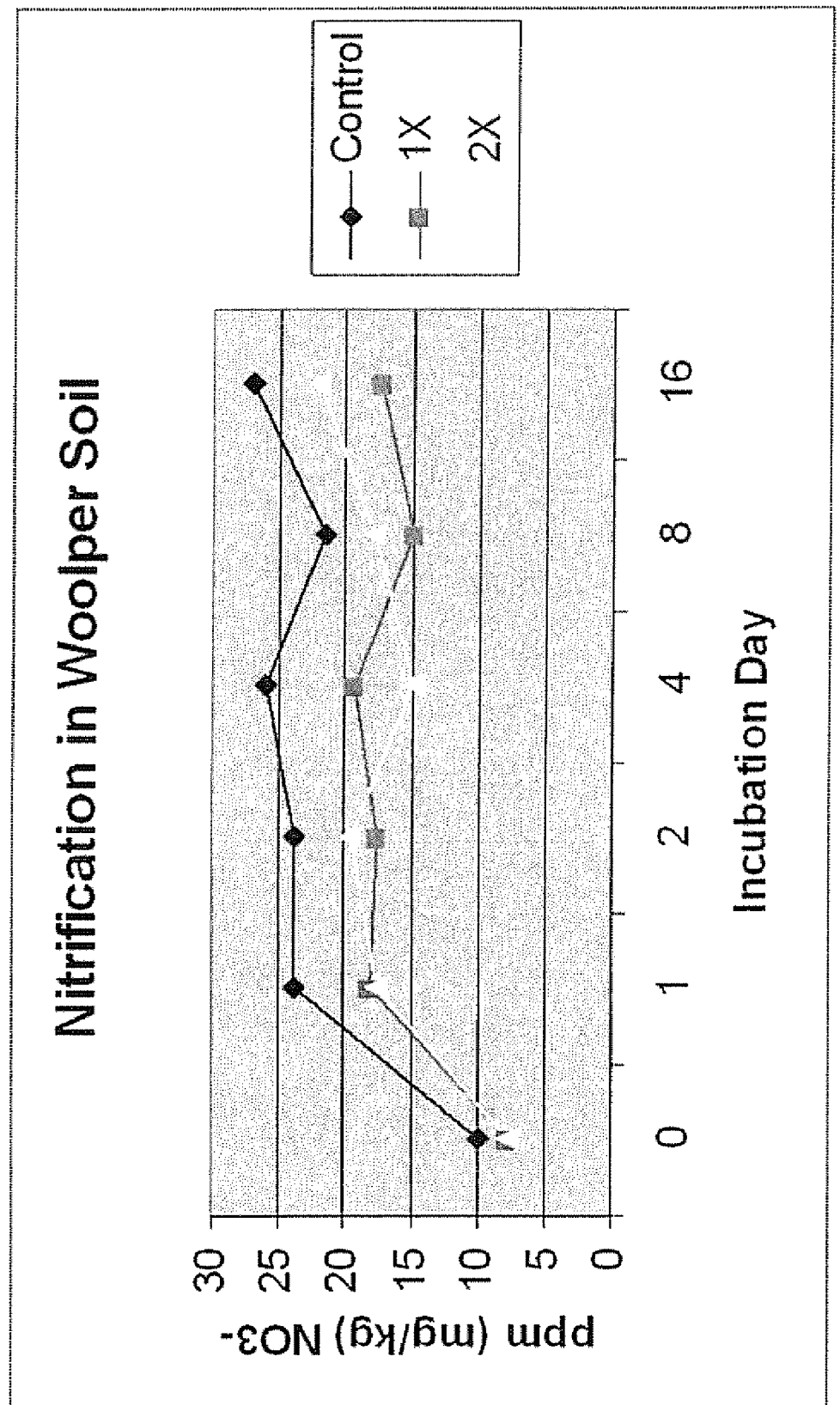

FERTILIZER-POLYMER MIXTURES WHICH INHIBIT NITRIFICATION IN SOILS

BACKGROUND OF THE INVENTION

1. Field of the Invention

The present invention is broadly concerned with improved, low pH aqueous polymer mixtures containing polymers having anionic (e.g., carboxylate) functional groups, and the use of such mixtures in or with liquid or solid fertilizer materials containing ammoniacal nitrogen, so as to reduce the extent of nitrification of the ammoniacal nitrogen when applied to soils. More particularly, the invention is concerned with such polymer mixtures, their metal salts or complexes, fertilizer products and methods, wherein the selected polymers or polymer derivatives are substantially water dispersible, carboxylated copolymers, most preferably the partial metal salts of maleic-itaconic polymers.

2. Description of the Prior Art

Plants have been fertilized with nitrogen-containing nutrients since the dawn of organized agriculture. However, simple incorporation of various nitrogenous ingredients into the soil is inefficient and possibly detrimental (e.g., the well-known phenomenon of "fertilizer burn"). Growing plants often do not absorb a sufficiently large fraction of provided nitrogen, and applied nitrogen can be lost through a variety of mechanisms such as volatilization, leaching, hydrolysis, and nitrification. The general nitrogen cycle is well known, Bundy, *Soil and Applied Nitrogen, Wisconsin-Madison Extension Pub. No. A2519* (1998). Additionally, a review of current nitrogen fertilization technology provides additional details, Shaviv, *Int'l. Fertilizer Industry Assn. Int'l. Workshop on Enhanced-Efficiency Fertilizers* (2005).

When ammoniacal nitrogen is added to soil, it is subject to nitrification whereby soil bacteria including nitrosomonas convert the ammonium to nitrate ($NO_3$). Thus, if ammoniacal nitrogen is not immediately taken up by plants, it will soon be converted to nitrate in appropriate soils and be subject to losses from leaching or volatilization. The nitrification process is temperature and moisture-dependent, and also is strongly affected by specific soil chemistries. The problem of nitrification has led to a variety of proposals for slowing down or eliminating the conversion of ammonium to nitrate by using nitrification inhibitors.

One prior fertilization technique involves sustained release fertilizers wherein a coating is applied to nitrogen fertilizer particles to impede or otherwise control the mass transfer of nutrients into the soil. Sustained release coatings are generally not water soluble and thus the fertilizer products are not generally suitable for use in liquid fertilizers. In addition, such sustained release coatings are relatively expensive owing to the cost of materials and reaction scheme complexity needed to prepare them.

Another technique is a use of urease inhibitors in nitrogen-containing fertilizer products, in an effort to increase fertilizer uptake and minimize volatilization losses. However, prior urease inhibitors are applicable only for a few of the many types of nitrogen fertilizers, and tend to be expensive. Moreover, the inhibitors are effective for only a few days in reducing nitrogen loss, even though the problem persists throughout the entire growing season; thus multiple applications are often required. Inhibitors are often subject to hydrolysis and are subject to storage temperature restrictions in order to retain efficacy. Finally, the inhibitor doses must be strictly controlled to reduce deleterious, plant-damaging side effects. Watson, *Int'l. Fertilizer Industry Assn. Int'l. Workshop on Enhanced-Efficiency Fertilizers* (2005). See also, Rozas et al., *No-Till Maize Nitrogen Uptake and Yield; Effect of Urease and Inhibitor and Application Time, Agronomy Journal* 91 (1999); Bundy, *Managing Urea-Containing Fertilizers, Area Fertilizer Dealer Meetings* (2001); and Harris, *Evaluation of Agrotain Urease Inhibitor For Cotton Production in the Southeast, UGA Cotton Research Extension Report* (2002).

The patent literature is also replete with teachings pertaining to fertilizer compositions. For example, U.S. Pat. No. 5,024,689 describes nitrogen fertilizers with nitrification inhibitors. U.S. Pat. No. 5,364,438 describes fertilizer formulations containing water, urea, ammonium nitrate, a phosphoric triamide urease inhibitor, and a nitrification inhibitor. U.S. Pat. No. 5,698,003 also discloses triamide-based urease inhibitors in fertilizers.

U.S. Pat. No. 6,515,090 describes a series of anionic polymers useful in fertilizers for enhancing plant growth. This patent discloses that the polymers are effective for preventing volatilization of nitrogen, but does not describe any nitrification inhibition properties or uses.

Despite this long history and abundant prior art, there exists a series of unresolved problems centered around inefficient utilization of nitrogen nutrients by growing plants. These problems are particularly acute in the context of reducing or eliminating nitrogen loss resulting from nitrification.

SUMMARY OF THE INVENTION

The present invention overcomes the problems outlined above and provides specifically formulated aqueous polymer mixtures which can be applied directly to soil or incorporated into or with liquid or solid fertilizers containing ammoniacal nitrogen, in order to inhibit the nitrification process within the soil and thus increase crop yields. The preferred liquid aqueous polymer mixtures of the invention have a pH of up to about 2 and preferably up to about 1, and contain metal salts or complexes of the polymers. The polymer mixtures can be used at relatively low levels in liquid fertilizer materials, usually from about 0.1-2% by volume. Use of the fertilizer materials gives substantially increased yields owing to inhibition of nitrification.

As used herein, "ammoniacal nitrogen" is abroad term embracing fertilizer compositions containing ammoniacal nitrogen ($NH_4$) as well as fertilizer compositions and other compounds which are precursors of ammoniacal nitrogen or that cause ammoniacal nitrogen to be generated when the fertilizers or compounds undergo various reactions such as hydrolysis. To give but one example, the polymers of the invention may be applied to or mixed with urea or other nitrogen-containing fertilizers which have no ammoniacal nitrogen therein as such. Nonetheless, such fertilizers will undergo reactions in the soil to generate ammoniacal nitrogen in situ. Thus, in this example urea or other precursor nitrogen-containing fertilizers would be deemed to contain ammoniacal nitrogen.

BRIEF DESCRIPTION OF THE DRAWINGS

The single FIGURE is a graph illustrating the effectiveness of polymers in accordance with the invention in the inhibiting nitrification in soil, as described in Example 2.

DETAILED DESCRIPTION OF THE PREFERRED EMBODIMENTS

General Features of the Invention

It has been found that certain types of polymers and metal salts or complexes thereof applied directly to the soil or as a part of liquid or solid fertilizer compositions containing ammoniacal nitrogen, prevent nitrogen loss and indeed significantly improve nitrogen utilization efficiency in crop plants, resulting in enhanced crop yields. Generally, these polymers have a high proportion of anionic functional groups (especially carboxylate groups) and exhibit significant water dispersibilities, and are more preferably soluble in water. Preferred classes of useful polymers include acrylic-, itaconic-, maleic-, sulfonate-, and phosphonate-containing polymers and copolymers, and their metal salts or complexes.

Generally speaking, the polymers of the invention should have a molecular weight of about 1500 and above, and contain at least three and preferably more repeat units per molecule. (generally from about 10-500). Moreover, the polymers and their metal salts or complexes, should be water dispersible and preferably water soluble, i.e., they should be dispersible or soluble in pure water to a level of at least about 5% w/w at room temperature with mild agitation. These polymeric species should carry sufficient anionic functional groups so that, upon reaction with a sufficient quantity of cation (preferably of charge+2 or greater, e.g., Ca, Mg, Zn, Cu, Fe, Mn, Co, Ni), at least about 10% of all repeat units by mole fraction are cation-reacted. The polymeric species should be stable with respect to normal chemical, pH, and thermal variations encountered in typical agricultural formulations and field uses. Although not essential, it is preferred that the polymers of the invention be substantially biodegradable.

Polymeric species meeting these preferred criteria typically have at least about 10% or more preferably at least about 25% (by mole) anionic functional groups capable of reacting with polyvalent cations, with at least about 50% (by mole) of repeat units containing at least 1 carboxylate group. These species also are typically capable of forming stable solutions in pure water up to at least about 20% w/w solids at room temperature, are stable over a pH range of from about 1-10, and are chemically stable in storage at temperatures ranging from about −40° C. to +70° C.

Many if not most water soluble anionic polymers do not meet these preferred criteria. Exemplary polymers which are not suitable include salts of high molecular weight, polyacrylic acid homopolymers, styrene-maleic anhydride copolymers with styrene levels above about 60% by mole, olefin-maleic copolymers with olefin levels about 50% by mole, most cellulose-derived polymers, polyethers, alkoxylates, polyvinyl alcohols, and amid-backbone polymers.

To summarize, the preferred polymers of the invention have the following characteristics:
- Dispersible and more preferably fully soluble in water
- Have a significant number of anionic functional groups, i.e., at least 10% (more preferably at least 25%) anionic groups by mole fraction capable of reacting with multivalent metal cations.
- The anionic groups of the polymer actually react with mono- or multivalent cations in soil, while remaining dispersible or soluble in water.
- The polymer is stable thermally and chemically for convenient use.

Preferred Polymers and Fertilizers

In one preferred aspect of the invention, low pH aqueous polymer mixtures are provided which find particular utility in liquid fertilizer compositions including ammoniacal nitrogen-containing fertilizers with optional phosphate fertilizers. Broadly speaking, the polymer mixtures of the invention have a pH of up to about 2 (more preferably up to about 1), and contains from about 10-85% by weight solids. The polymers comprise recurring polymeric subunits each made up of at least two different moieties individually and respectively taken from the group consisting of A, B, and C moieties, or recurring C moieties, and C moieties which are not different (e.g., polyitaconic acid polymer), wherein moiety A is of the general formula

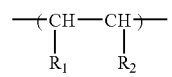

moiety B is of the general formula

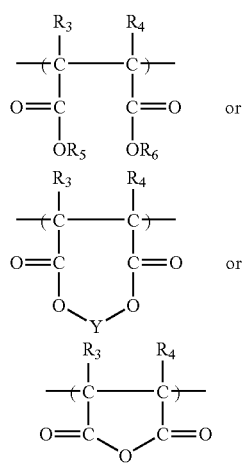

and moiety C is of the general formula

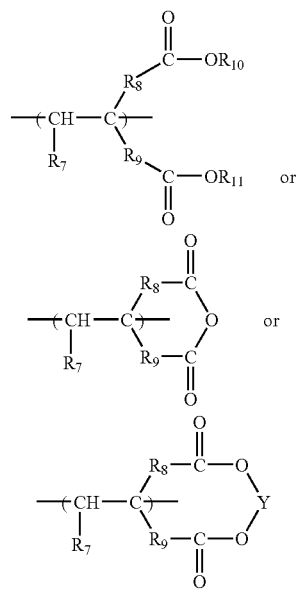

wherein $R_1$, $R_2$ and $R_7$ are individually and respectively selected from the group consisting of H, OH, $C_1$-$C_{30}$ straight, branched chain and cyclic alkyl or aryl groups, $C_1$-$C_{30}$ straight, branched chain and cyclic alkyl or aryl $C_1$-$C_{30}$ based ester groups (formate ($C_0$), acetate ($C_1$), propionate ($C_2$), butyrate ($C_3$), etc. up to $C_{30}$), $R'CO_2$ groups, and $OR'$ groups, wherein R' is selected from the group consisting of $C_1$-$C_{30}$ straight, branched chain and cyclic alkyl or aryl groups; $R_3$ and $R_4$ are individually and respectively selected from the group consisting of H, $C_1$-$C_{30}$ straight, branched chain and cyclic alkyl or aryl groups; $R_5$, $R_6$, $R_{10}$ and $R_{11}$ are individually and respectively selected from the group consisting of H, the alkali metals, $NH_4$ and the $C_1$-$C_4$ alkyl ammonium groups, Y is selected from the group consisting of Fe, Mn, Mg, Zn, Cu, Ni, Co, Mo, V, Cr, Si, B, and Ca; $R_8$ and $R_9$ are individually and respectively selected from the group consisting of nothing, $CH_2$, $C_2H_4$, and $C_3H_6$.

In further preferred forms, at least one of $R_1$, $R_2$, $R_3$ and $R_4$ is OH where the polymeric subunits are made up of A and B moieties, at least one of the $R_3$, $R_2$ and $R_7$ is OH where the polymeric subunits are made up of A and C moieties, and at least one of the $R_1$, $R_2$, $R_3$, $R_4$, and $R_7$ is OH where the polymeric subunits are made up of A, B and C moieties.

The most preferred polymers of the invention are reaction products of the following maleic acid and itaconic monomers:

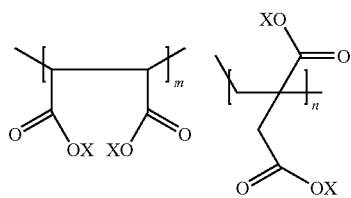

where X is individually and respectively taken from the group consisting of cations, preferably hydrogen, the alkali metal, and alkaline earth metals, and most preferably H, NH4, Na, K, Ca, Mg, and mixtures thereof, and the m:n ratio ranges from about 99:1 to about 1:99.

This reaction product has the general formula:

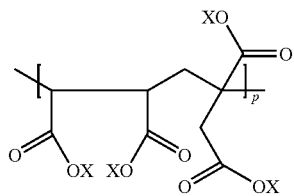

where X is as defined above and p from about 10 to 500.

In many cases, it is preferred to react the polymer with a metal selected from the group consisting of the alkali and alkaline earth metals to form salts or complexes thereof, with the most preferred metal being calcium.

The aqueous polymer mixtures of the invention may be directly applied to soil for inhibiting nitrification. More preferably, however, these low pH aqueous polymers are mixed with an ammoniacal nitrogen-containing fertilizer to form a liquid or solid fertilizer material which is applied to soils subject to nitrification, and typically in the regions adjacent growing plants or pre-emergent planted seeds. In this regard, it has been found that the aqueous polymer mixtures should be used with such liquid fertilizers at relatively low levels of up to about 2% by volume (e.g., 0.01-2%), based upon the total volume of the fertilizer material taken as 100% by volume. Surprisingly, even better nitrification-inhibition results have been found at lower polymer levels, on the order of about 0.2-0.7% by volume, more preferably about 0.5% by volume.

A wide variety of ammoniacal nitrogen-containing fertilizers may be used with the low pH polymer mixtures of the invention. Representative examples include monoammonium phosphate (MAP), diammonium phosphate (DAP), any one of the well known N-P-K fertilizers, ammonia (anhydrous or aqueous), ammonium nitrate, ammonium sulfate, urea, ammonium thiosulfate, and the ammonium phosphates. Likewise, a large number of phosphate fertilizers may be used, such as the ammonium phosphates, calcium phosphates (normal phosphates and super phosphates), phosphoric acid, superphosphoric acid, basic slag, rock phosphate, colloidal phosphate, and bone phosphate.

Other typical fertilizer ingredients may also be used in the fertilizer materials of the invention such as micronutrients (Zn, Mn, Cu, Fe) and the oxides, sulfates, chlorides, and chelates of such micronutrients.

In preparing the liquid fertilizer materials of the invention, the ammoniacal nitrogen-containing fertilizer material(s) are suspended in water and the aqueous polymer mixture(s) are added thereto with mixing. No particular mixing regime or temperature conditions are required. Surprisingly, it has been found that these liquid fertilizer materials are quite stable and resist settling out or precipitation of solids over extended storage periods of at least about two weeks. In the case of solids, the polymers are directly applied to the solid fertilizer.

Although not wishing to be bound by any theory or mechanism of operation, it is believed that the polymers of the invention interfere with or disrupt normal soil nitrification processes by inhibiting the action of one or more of the metalloenzymes responsible for soil nitrification, such as ammonia monooxygenase. However, such enzyme activity is disrupted or inhibited in the microenvironments where the polymers or fertilizer mixtures of the invention are present. Thus, normal soil processes remain in place outside of such microenvironments.

The single most preferred polymeric material for use in the invention is an aqueous mixture containing maleic-itaconic copolymer having a molecular weight of about 3000, reacted with calcium to form a partial salt so as to have a pH of about 1. Such a polymer salt may be made in accordance with the teachings of U.S. Pat. No. 6,515,090, and is mixed in an aqueous medium at a solids content of about 40% by weight.

EXAMPLES

The following examples set forth the advantages of the present invention in inhibiting soil nitrification. It is to be understood, however, that these examples are provided by way of illustration and nothing therein should be taken as a limitation upon the overall scope of the invention.

Example 1

In this example a series of UAN solutions were prepared, including the preferred maleicitaconic polymer of the invention. Specifically, each starting UAN solution contained ⅓ by weight urea, ⅓ by weight ammonium nitrate, and ⅓ by weight water. Individual quantities of the UAN solution were then supplemented with either 0.5% by volume or 1% by volume polymer, wherein the polymer material had an initial pH of 1, 2 or 3.5, as set forth in Table 1 below. The respective polymer-supplemented UAN solutions, as well as two control, no-polymer UAN solutions, were diluted to ½ UAN-polymer solution or no-polymer control by volume, ½ water by volume.

The diluted solutions were then sprayed three or four times (April 18) over identically-sized replicate plots of Pembroke silt loam soil in Princeton, Ky. previously planted (April 10) with Pioneer 33P70 corn seed at 27,500 seeds/acre. This resulted in nitrogen levels derived from the diluted UAN solutions of 75 lbs/acre in the triple-sprayed plots and 100 lbs/acre in the four times sprayed plots. The soil plots were previously (April 12) fertilized preplant with 0-90-90 lbs/acre NPK fertilizer. This soil was characterized by soil tests (Mehlich 3) with P at 46 lbs/acre, K at 274 lbs/acre, and a soil pH of 6.5. The plots experienced rain fall of 0.08, 0.54 and 1.62 inches on the three successive days after the solutions were applied (April 19-21). At the end of the growing season (September 26), the corn was hand harvested and yields were measured.

The results of these tests are summarized below.

TABLE 1

| Soln. No. | Added Polymer (pH/Conc.) | Plot 1 Yield (bu/Acre) | Plot 2 Yield (bu/Acre) | Plot 3 Yield (bu/Acre) | Plot 4 Yield (bu/Acre) | Avg. Yield (bu/Acre) |
|---|---|---|---|---|---|---|
| 1 | 1/0.5% | 137.7 | 120.6 | 111.4 | 129.4 | 124.8 |
| 2 | 2/0.5% | 124.2 | 112.9 | 110.5 | 116.7 | 117.2 |
| 3 | 3.5/0.5% | 129.3 | 110.4 | 108.2 | 120.9 | 117.2 |
| 4 | 1/1% | 139.4 | 120.6 | 108.2 | 109.1 | 119.3 |
| 5 | 2/1% | 131.8 | 84.1 | 97.0 | 108.3 | 105.3 |
| 6 | 3.5/1% | 125.1 | 111.2 | 101.3 | 104.4 | 110.5 |
| Control 1 | — | 127.6 | 95.1 | 101.3 | 110.0 | 108.5 |
| Control 2 | — | 142.8 | 112.1 | 123.3 | 133.7 | 128.0 |

The above data demonstrates that the polymer-supplemented test solutions gave statistically significant yield enhancements, as compared with the no-polymer control. These yield gains were attributed to control of nitrification in the soil, and not to volatilization of ammonia, because of the heavy rainfall immediately following the application of the solutions. It is especially surprising that the best yields were obtained at lower pH levels, especially pH 1. Also, the lower concentration rate of 0.5% gave generally superior yields, as compared with the higher 1% concentration. Finally, a comparison of the Control 2 test versus Solution 1 demonstrates that the presence of the polymer was equivalent of the addition of about 20 lbs/acre of nitrogen from UAN.

Example 2

In this test the extent of nitrification within a soil subject to substantial nitrification (Woolper soil) was measured in a laboratory context. Specifically, two different fertilizer products were prepared using laboratory grade ammonium sulfate and 0.25% by weight and 0.5% by weight of the preferred calcium partial salt of maleic-itaconic polymer of the invention (pH 1), based upon the total weight of the fertilizer and polymer taken as 100% by weight. These two fertilizer products, and a control made up of only ammonium sulfate were mixed into identical quantities of the test soil, at the same levels of addition. Thereafter, the quantity of nitrate within each soil sample was measured over a period of 16 days.

The FIGURE illustrates the results of this test. It will be seen that the control material exhibited high levels of nitrification, whereas the two polymer-supplemented fertilizers had statistically significant reductions in nitrification Unexpectedly, the 0.25% polymer-supplemented fertilizer gave closely similar and in some cases superior inhibition of nitrification, as compared with the higher 0.5% product.

Example 3

This example is similar to the yield tests of Example 1, and involves application of UAN-polymer supplemented solutions to identically-sized, corn-planted plots in Courtland, Kans. The soil was Crete silt loam, pH 7.1, Bray P-1 18 ppm, exchangeable K 220 ppm organic matter content 2.5%. Specifically, the plots were planted in 30 inch rows (April 20) in soybean residue with Pioneer 33B51 Corn Seed, and a starter 10-34-0 NPK fertilizer was applied at the time of planting (10 gal/acre). Six replicate plots were used for each test solution. Shortly after planting, the plots were broadcast sprayed without incorporation with a series of UAN-polymer solutions having varying amounts of polymer at various polymer pH levels, to achieve a 160 lbs/acre N derived from the solutions. The plots were furrow irrigated as required during the growing season and the corn was harvested (October 1) and the yields were calculated and averaged. The following Table 2 summarizes these tests.

TABLE 2

| Soln. No. | Added Polymer (pH/Conc.) | Avg. Yield (bu/Acre) |
|---|---|---|
| 1 | 1/0.5% | 220.9 |
| 2 | 1/1% | 215.9 |
| 3 | 2/0.5% | 203.5 |
| 4 | 2/1% | 213.1 |
| 5 | 3.5/0.5% | 208.1 |
| 6 | 3.5/1% | 217.7 |

The irrigation of the test plots essentially prevented any nitrogen loss owing to ammonia volatilization. Accordingly, the yield increases were attributable to control of nitrification within the test soil. This data further confirms the finding that enhanced yields are obtained at lower pH levels and at lower polymer concentrations.

Example 4

Commercial 10-34-0 liquid fertilizer was formulated with an aqueous mixture containing a partial calcium salt of maleic-itaconic copolymer at pH 1.5. The fertilizer mixture contained 95% v/v 10-34-0 and 5% v/v of a 40% w/w solids mixture of the copolymer, and was made by simple mixing of two liquids. The fertilizer mixture did not display any observable precipitation upon mixing. The fertilizer mixture was then subjected to a simulated ageing and heat stress test by heating it to 40° C. and maintaining this temperature for several days, followed to cooling to ambient temperature. Again, no observable precipitate was observed during heating or thereafter.

This test represents a significant excess amount of calcium ion as compared with typical uses, in order to illustrate the unusual stability characteristics of the fertilizer mixture. It is well known in the art that addition of soluble calcium compounds to liquid nitrogen-containing polyphosphate fertilizers such as 10-34-0 results in rapid precipitation of various calcium phosphates. Therefore, the ability of the copolymer to maintain the fertilizer in dispersion without significant precipitation is a decided advance in the art.

All references cited above are expressly incorporated by reference herein.

We claim:

1. An aqueous polymer mixture having a pH of up to about 2, said polymer mixture including the acid or partial salt form of a copolymer having the formula

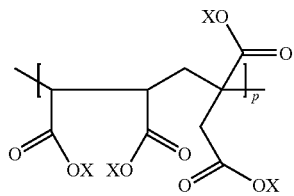

where X is a cation selected from the group consisting of H, Ca, Mg, and mixtures thereof, and p ranges from about 10-500.

2. A method comprising the step of applying to soil the polymer mixture of claim 1.

3. The polymer mixture of claim 1, including an amount of ammoniacal nitrogen-containing fertilizer mixed with the copolymer.

4. The polymer mixture of claim 3, said copolymer being present at a level of from about 0.01-2% by volume.

5. The polymer mixture of claim 3, said level being about 0.5% by volume.

6. The polymer mixture of claim 3, further including a quantity of a phosphate fertilizer mixed with the copolymer.

7. The polymer mixture of claim 1, said copolymer having a molecular weight of about 3000, a pH of about 1, and with at least some of the X substituents being H and the other X substituents being Ca.

8. The polymer mixture of claim 1, said copolymer having a molecular weight of about 1500 and above.

9. The polymer mixture of claim 1, said copolymer being dispersible or soluble in pure water to a level of at least about 5% w/w at room temperature with mild agitation.

10. The polymer mixture of claim 1, with at least about 10% of said X substituents are selected from the group consisting of Ca, Mg, and mixtures thereof.

11. The polymer mixture of claim 10, said copolymer having a molecular weight of about 3000, a pH of about 1, and with at least some of the X substituents being H and the other X substituents being Ca.

12. A polymer mixture of claim 1, said pH being up to about 1.

13. The polymer mixture of claim 1, wherein at least certain of said X substituents are H, and others of the X substituents are selected from the group consisting of Ca, Mg, and mixtures thereof.

14. A method comprising the step of applying to soil the polymer mixture of claim 3.

* * * * *